(12) United States Patent
Miyake et al.

(10) Patent No.: US 6,818,145 B1
(45) Date of Patent: Nov. 16, 2004

(54) ANTIFREEZE/COOLANT COMPOSITION

(75) Inventors: Yuji Miyake, Gifu (JP); Nobuyuki Kaga, Gifu (JP)

(73) Assignee: Shishiai-Kabushikigaisha, Gifu (JP)

( * ) Notice: Subject to any disclaimer, the term of this patent is extended or adjusted under 35 U.S.C. 154(b) by 0 days.

(21) Appl. No.: 10/239,386

(22) PCT Filed: Mar. 23, 2000

(86) PCT No.: PCT/JP00/01795
§ 371 (c)(1),
(2), (4) Date: Jan. 10, 2003

(87) PCT Pub. No.: WO01/70901
PCT Pub. Date: Sep. 27, 2001

(51) Int. Cl.[7] ................................................ C01K 5/00
(52) U.S. Cl. .............................. 252/70; 252/76; 252/79
(58) Field of Search .............................. 252/70, 76, 79

(56) References Cited

U.S. PATENT DOCUMENTS 5,811,025 A * 9/1998 Kawai et al. .................. 252/70
6,126,851 A * 10/2000 Miyake et al. ................ 252/76

* cited by examiner

Primary Examiner—Yogendra N. Gupta
Assistant Examiner—D. G. Hamlin
(74) Attorney, Agent, or Firm—Gray Cary Ware & Freidenrich, LLP

(57) ABSTRACT

A durable antifreeze/coolant composition for coolants for the cooling systems of internal combustion engines is disclosed. The composition is excellent in inhibiting corrosion of metal portions, especially iron and aluminum portions and effectively inhibits cavitation damage. The antifreeze/coolant composition includes about 0.1–8.0% by weight of $C_6$–$C_{12}$ aliphatic dibasic acid and/or an alkali metal salt thereof and about 0.1–10% by weight of p-toluic acid and/or an alkali metal salt thereof.

5 Claims, 1 Drawing Sheet

ANTIFREEZE/COOLANT COMPOSITION

BACKGROUND OF THE INVENTION

1. Technical Field

This invention relates to an antifreeze/coolant composition. More particularly, this invention relates to an antifreeze/coolant composition which excels in corrosion inhibition of metals used in a cooling system for an engine, particularly cast aluminum and cast iron over an extended period of time. The antifreeze/coolant composition also effectively inhibits cavitation damage.

2. Background Art

A cooling system for an internal-combustion engine generally uses various metals such as aluminum, cast aluminum, cast iron, steel, brass, solder and copper, which are prone to corrosion over time by water or moist air. In order to inhibit metal corrosion, a coolant composition or antifreeze composition containing a metal corrosion inhibitor such as phosphate, silicate. amine salt, borate and nitrite is conventionally used.

However, these conventional metal corrosion inhibitors have certain detects.

Phosphate can cause eutrophication in rivers or lakes, raising BOD (biochemical oxygen demand) and/or COD (chemical oxygen demand) in the waters and propagate algae and weeds, leading to generation of harmful slime or red tides.

Further, phosphate chemically reacts with hard water components contained in the cooling water (coolant) and produces precipitation, which deteriorates metal corrosion inhibition of the coolant and may obstruct coolant circulation.

An amine salt reacts with nitrite in the coolant and produce nitrosoamine, a carcinogenic substance.

Borate will progressively corrode aluminum and cast aluminum while silicate is chemically unstable and tends to gel when the temperature or pH value fluctuates or when another salt coexists, deteriorating its metal corrosion inhibitive function.

Cooling water in a cooling system contains some air, which produces microscopic bubbles in the cooling water when pressure differential is locally created in the circulating cooling water. The bubbles thus produced may cause cavitation damage to metal surfaces in a cooling system, especially to surfaces of iron portions. Such bubbles can also be produced by severe vibration of the coolant.

Conventionally, nitrite is added in an antifreeze or coolant composition to prevent cavitation damage. It is a general understanding that nitrite forms protective films on metal surfaces.

However, as mentioned in the above, nitrite produces nitrosoamine, a carcinogenic substance, by chemical reaction with an amine salt. No conventional and practical alternatives for nitrite to inhibit cavitation damage have been introduced.

The inventors of the present invention have discovered that a combination of $C_6$–$C_{12}$ aliphatic dibasic acid and/or its alkali metal salt and p-toluic acid and/or its alkali metal salt shows an excellent metal corrosion inhibition and cavitation inhibition.

Accordingly, it is an object of the present invention to provide a durable antifreeze/coolant composition which excellently inhibits corrosion of metals, particularly aluminum and iron, and cavitation damage in a cooling system without causing biohazard.

SUMMARY OF THE INVENTION

The antifreeze/coolant composition of the present invention comprises a glycol as the chief ingredient, such as ethylene glycol, propylene glycol, 1,3 butylene glycol, hexylene glycol, diethylene glycol or glycerol, among which ethylene glycol and propylene glycol are preferred for their chemical stability and low production costs. The antifreeze/coolant composition of the present invention further comprises at least one ingredient selected from the group consisting of $C_6$–$C_{12}$ aliphatic dibasic acids and alkali metal salts thereof and at least one ingredient selected from the group consisting of p-toluic acid (4-methyl benzoic acid) and alkali metal salts thereof.

The $C_6$–$C_{12}$ aliphatic dibasic acid may be suberic acid, azelaic acid, sebacic acid, undecanoic diacid or dodecanoic diacid, among which sebacic acid is preferred. An alkali metal salt such as sodium or potassium salt of $C_6$–$C_{12}$ aliphatic dibasic acid can be utilized instead or together.

A combination of $C_6$–$C_{12}$ aliphatic dibasic acid and/or an alkali metal salt thereof and p-toluic acid and/or an alkali metal salt thereof, when used in the cooling water of a cooling system, excellently inhibits metal corrosion and cavitation in the cooling system.

$C_6$–$C_{12}$ aliphatic dibasic acid and/or an alkali metal salt thereof when blended with p-toluic acid and/or An alkali metal salt thereof effectively inhibits corrosion of metals, especially iron and aluminum, as well as cavitation damage.

It is preferred that at least one ingredient selected from the group consisting of $C_6$–$C_{12}$ aliphatic dibasic acid and alkali metal salts thereof is blended in the antifreeze/coolant composition of the present invention in an amount of about 0.1–8.0% by weight. If less than about 0.1% by weight, the metal corrosion and cavitation inhibition of the antifreeze/coolant composition would not be satisfactory, and if more than about 8.0% by weight, the excess would be a waste.

P-toluic acid and/or an alkali metal salt thereof when blended with $C_6$–$C_{12}$ aliphatic dibasic acid and/or an alkali metal salt thereof effectively inhibits corrosion of metals, especially iron and aluminum, as well as cavitation damage.

It is preferred that at least one ingredient selected from the group consisting of p-toluic acid and alkali metal salts thereof is blended in the antifreeze/coolant composition of the present invention in an amount of about 0.1–10% by weight. If less than about 0.1% by weight, the metal corrosion and cavitation inhibition of the antifreeze/coolant composition would not be satisfactory, and if more than about 10% by weight, the excess would be a waste.

The antifreeze/coolant composition of the present invention can provide excellent metal corrosion and cavitation inhibitory properties even without silicate, amine salts, borate, nitrite or phosphate which are conventionally blended in a conventional coolant composition.

When such conventional ingredients are absent, nitrosoamine will not be produced from the antifreeze/coolant composition of the present invention because an amine salt or nitrite is not present. Silicate is unstable in coolant and will form gel when the temperature and pH value of the coolant changes or other salts are present in the coolant. Therefore, absence of silicate contributes to chemical stability of the antifreeze/coolant composition and to avoidance of gel formation in the cooling water. Borate tends to corrode aluminum and cast aluminum and nitrite quickly deteriorates, losing its corrosion inhibitory function quickly. Absence of borate and nitrite prevents such drawbacks.

Further, eutrophication in rivers or lakes will not result from use of the antifreeze/coolant composition of the present invention because phosphate is absent in the antifreeze/ coolant composition of the present invention. Eutrophication of rivers or lakes when generated raises BOD (biochemical oxygen demand) and/or COD (chemical oxygen demand) and propagates algae and weeds in the waters, which will produce harmful slime and red tides.

Chemical reaction with hard water components in the cooling water and deterioration in metal corrosion inhibition are effectively avoided because phosphate is absent in the antifreeze/coolant composition of the present invention. Precipitation of chemical reaction products is avoided as well.

The antifreeze/coolant composition of the present invention may further comprise a triazole. Triazoles effectively inhibit copper and aluminum corrosion. The triazole to be blended in the composition may be selected from benzotriazol, tolyltriazol, 4-phenyl-1,2,3-triazol, 2-naphthotoriazol and 4-nitrobenzotriazol. The triazole may be blended in an amount of about 0.05–1.0% by weight.

The antifreeze/coolant composition of the present invention may further comprise a thiazole in an amount of about 0.1–1.0% by weight. The thiazole may be mercaptobenzotriazol. Thiazoles effectively inhibit corrosion of copper.

The antifreeze/coolant composition of the present invention may optionally comprise an antifoam and/or colorant, and/or a conventional metal corrosion inhibitor such as molybdate, tungstate, sulfate, nitrate, benzoate or their alkali metal salts.

DETAILED DESCRIPTION OF THE PREFERRED EMBODIMENT

Figure 1:
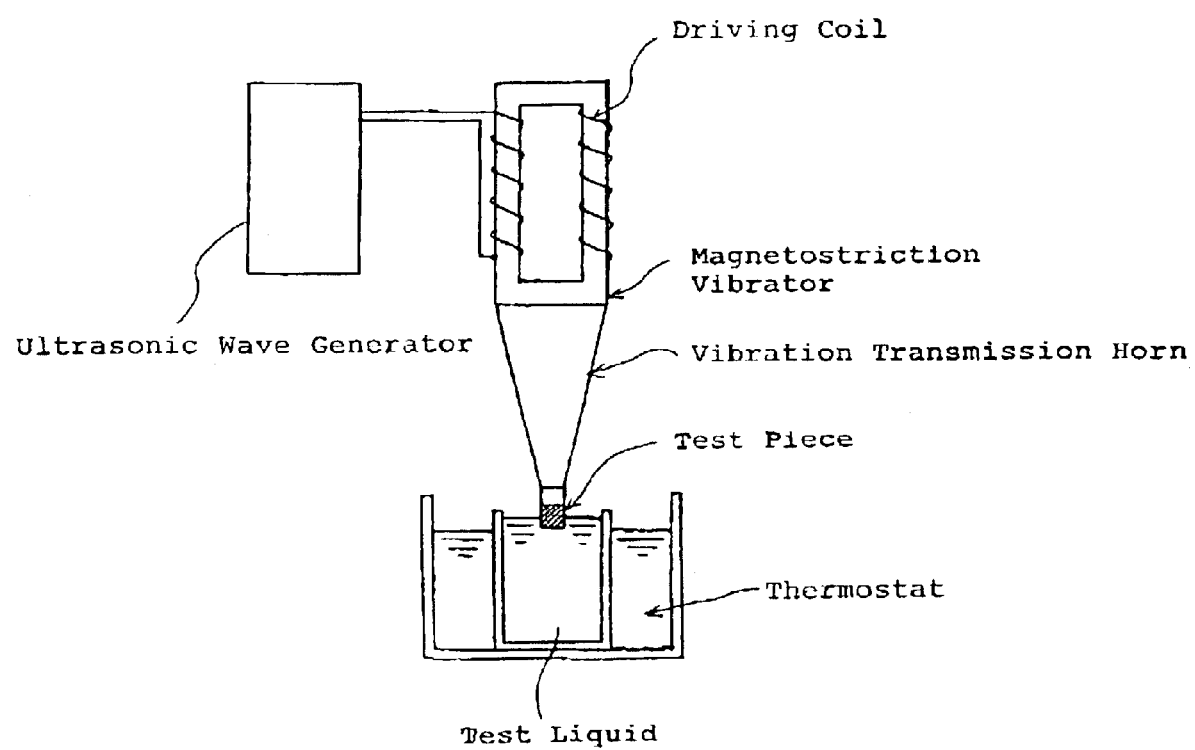
FIG. 1 schematically shows an apparatus for studying the cavitation inhibitory property of compositions.

Embodiment antifreeze/coolant compositions of the present invention, Embodiments ("Emb") #1–#3, and comparison antifreeze/coolant compositions containing only $C_6$–$C_{12}$ aliphatic acid or an alkali metal salt thereof or p-toluic acid or an alkali metal salt thereof, Comparisons ("Com") #4–#8, were prepared as test samples (#1–#8). Table 1 shows their respective ingredients.

TABLE 1

| Ingredient | Emb #1 | Emb #2 | Emb #3 | Com #4 | Com #5 | Com #6 | Com #7 | Com #8 |
|---|---|---|---|---|---|---|---|---|
| P-toluic acid | 2.0 | 4.0 | 0.1 | — | 2.0 | — | — | — |
| Sodium benzoate | — | — | — | — | — | 2.0 | — | — |
| P-tert butyl | — | — | — | — | — | — | 2.0 | — |

TABLE 1-continued

| Ingredient | Emb #1 | Emb #2 | Emb #3 | Com #4 | Com #5 | Com #6 | Com #7 | Com #8 |
|---|---|---|---|---|---|---|---|---|
| benzoate | | | | | | | | |
| 2-ethyl-hexanoic acid | — | — | — | — | — | — | — | 4.0 |
| Sebacic acid | 2.0 | 0.1 | 4.0 | 2.0 | — | 2.0 | 2.0 | 0.3 |
| Tolyltriazol | 0.3 | 0.3 | 0.3 | 0.3 | 0.3 | 0.3 | 0.3 | 0.2 |
| 2-mercapto-benzothyazol soda | 0.2 | 0.2 | 0.2 | 0.2 | 0.2 | 0.2 | 0.2 | — |
| Potassium hydroxide | 2.0 | 1.7 | 2.3 | 1.1 | 0.8 | 1.1 | 1.8 | 1.7 |
| Ethylene glycol | rest | rest | rest | rest | rest | rest | rest | rest |
| pH (30%) | 8.1 | 8.1 | 8.1 | 8.1 | 8.1 | 8.1 | 8.1 | 8.4 |

Metal corrosion tests according to JIS K 2234 7.8 (Japan Industrial Standard) were carried out with Embodiments #1–#3 and Comparisons #4–#8 against test metal pieces of cast aluminum, cast iron, steel, brass, solder and copper. The results are given in Table 2.

TABLE 2

| | Change in weight (mg/cm2) | | | | | | | |
|---|---|---|---|---|---|---|---|---|
| Metal | Emb #1 | Emb #2 | Emb #3 | Com #4 | Com #5 | Com #6 | Com #7 | Com #8 |
| Cast aluminum | −0.02 | −0.05 | −0.09 | −0.23 | −0.23 | −0.55 | −0.04 | −0.17 |
| Cast iron | −0.01 | −0.06 | +0.02 | −1.14 | −2.20 | +0.02 | +0.01 | +0.02 |
| Steel | +0.02 | −0.05 | +0.02 | −0.04 | −0.06 | −0.02 | 0.00 | −0.04 |
| Brass | −0.03 | −0.05 | −0.03 | −0.01 | −0.04 | −0.03 | −0.06 | −0.05 |
| Solder | +0.01 | −0.12 | −0.08 | −0.03 | −0.07 | −0.07 | −0.05 | −0.21 |
| Copper | −0.07 | −0.06 | −0.08 | +0.05 | −0.01 | −0.04 | −0.04 | −0.05 |
| Appearance | No change | No change | No Change | Iron local corr. | Iron local corr. | Cast Al. tarnish | No change | No Change |

Cavitation inhibition tests were carried out on cast iron pieces with the test samples #1–#8 using the apparatus shown in FIG. 1. The test conditions are given in Table 3.

TABLE 3

| Item | Condition |
|---|---|
| Frequency | 19 KHz |
| Amplitude | 30 μm |
| Test pieces | FC200 (cast iron) |
| Shape/size | Circular disk/16 mm D |
| Concentration | 20% JIS Water dilution |
| Amount | 50 ml |
| Temperature | 50° C. |
| Depth | 4 mm |

The test results are given in Table 4.

TABLE 4

| Weight reduction (mg) | |
|---|---|
| Embodiment #1 | 37.5 |
| Embodiment #2 | 49.3 |
| Embodiment #3 | 43.1 |
| Comparison #4 | 88.6 |
| Comparison #5 | 190.2 |
| Comparison #6 | 70.4 |

TABLE 4-continued

| Weight reduction (mg) | |
|---|---|
| Comparison #7 | 78.8 |
| Comparison #8 | 120.9 |

As Tables 2 and 4 show. Comparisons #4–#8 did not show overall satisfactory properties in both metal corrosion inhibition and cavitation inhibition, while Embodiments #1–#3 showed excellent metal corrosion inhibitory and cavitation inhibitory properties.

What is claimed is:

1. An antifreeze/coolant composition comprising a glycol as the main ingredient, about 0.1–8.0% by weight of at least one ingredient selected from the group consisting of $C_6$–$C_{12}$ aliphatic dibasic acid and alkali metal salts thereof and about 0.1–10% by weight of at least one ingredient selected from the group consisting of p-toluic acid and alkali metal salts thereof.

2. An antifreeze/coolant composition of claim 1, wherein no working amount of silicate, amine salts, borate, nitrate or phosphate is present.

3. An antifreeze/coolant composition of claim 1 or 2, further comprising about 0.5–0.1% by weight of at least one thiazole.

4. An antifreeze/coolant composition of claim 1 or 2, further comprising about 0.01–1.0% by weight of at least one thiazole.

5. An antifreeze/coolant composition of claim 1 or 2, further comprising about 0.5–1.0% by weight of at least one triazole and about 0.01–1.0% by weight of at least one thiazole.

* * * * *